UNITED STATES PATENT OFFICE 2,115,275

DIESEL FUEL

Robert C. Moran, Wenonah, and Darwin E. Badertscher, Woodbury, N. J., assignors to Socony-Vacuum Oil Company, Incorporated, New York, N. Y., a corporation of New York.

No Drawing. Application January 23, 1936, Serial No. 60,448

4 Claims. (Cl. 44—9)

This invention has to do with fuels for internal combustion engines of the Diesel type, and is concerned with the modification of such fuels by the addition of characterizing ingredients for the purpose of modifying and/or controlling the combustion characteristics of the fuel.

The requirements of a Diesel cycle call for a fuel whose ignition and combustion characteristics are the opposite of those usually desired in an Otto cycle internal combustion engine as typified by the usual spark-ignition gasoline engine. The desired combustion in an ordinary gasoline engine is one of a controlled or controllable slowness, since too rapid ignition causes the phenomena usually characterized by the inclusive term "knocking". In the Diesel cycle, the desired characteristics are diametrically opposite, and enhanced speed of ignition is desired. Here the fuel is injected into a combustion space and it may exert maximum efficiency only when the delay period between injection and ignition is as short as possible. Improperly delayed ignition in a Diesel engine also gives rise to phenomena known as "knocking", due to improper coordination of combustion phenomena and cylinder conditions, although the reason for such knocking is the reverse of that for knocking in gasoline engines of ordinary type.

This invention has to do with the use of novel characterizing ingredients in Diesel fuel tending to promote rapidity of combustion and so control the characteristics of the fuel.

This invention has for its object the improvement of Diesel fuels by the addition of certain compounds whose presence in small quantities promotes the rapidity of combustion of such fuels.

The novel Diesel fuels herein disclosed are characterized by the presence of small amounts of organic azido-derivatives, that is "triazo" compounds, as combustion accelerators, and comprise not only the distillates of the kerosene-like boiling range commonly denoted as Diesel fuel, but extend as well into the field of hydrocarbon products both heavier and lighter, as, for example, light and heavy fuel oils for use in Diesel engines, and gasoline for use in Diesel cycle gasoline engines.

Knocking characteristics of gasoline for use in Otto cycle engines of ordinary type are normally expressed in terms of octane number, after an accepted usage in the art. Knocking characteristics of Diesel fuels are at present best expressed by "cetene" numbers. The cetene number is the per cent by volume of cetene in a blend of cetene and alphamethylnaphthalene, which blended fuel has the same combustion characteristics as the fuel under test. (Boerlage and Broeze, J. Soc. Automotive Eng. 31, 282–93 (1932)). An increase in cetene number indicates a decrease in delay between fuel injection and fuel ignition and consequently indicates a betterment in fuel combustion characteristics. In fuels of gasoline nature intended for Diesel use, it is probably more convenient, at least at present, to express the characteristics by means of octane number, wherein a decrease would indicate improvement in quality of fuel for Diesel engine use. Both methods of evaluation are hereinafter made use of.

According to the present invention, Diesel fuels may be altered in combustion characteristics by the addition of small amounts of oil-soluble triazo organic compounds. As examples of some of the members of this group which have been found effective, there are noted the following: Triazo-acetone, B-triazo-ethanol, ethyl-triazoformate, B-triazo-ethyl triazo-acetate, and 1:2 diazido ethane.

The triazo compounds constitute a well-known group of organic chemical compounds, characterized by the presence of the monovalent triazo group

A general discussion of the group together with some notes as to synthesis of members thereof, will be found in Bernthsen (Sudburough) "Textbook of Organic Chemistry", edition 1930, D. Van Nostrand Co., pages 869, 870, 871. More complete directions for the synthesis of certain members of the group, particularly those members whose properties as Diesel fuel improvers are set forth below, will be found as follows:

Ethyl triazoacetate_____ Forster & Fierz J. C. S. (London) 93 79 (1908)
Ethyl triazoformate_____ Ibid. page 81
Triazoacetone_____ Ibid. page 81
1:2 Bistriazoethane      Forster, Fierz & Joshua
 (1:2 Diazidoethane).    Ibid. 93 1070 (1908)
Triazoethanol_____ Ibid. 93 1866 (1908)
Triazoethyltriazo-       Forster & Müller Ibid.
 acetate.                 95 201 (1909)

As an example of the efficacy of these ingredients the following data is given, in which the indicated percentages of the indicated compounds were added to a distillate Diesel fuel of the type commonly known as No. 2 furnace oil, having a gravity of 36.9° A. P. I., a 10% A. S. T. M. distillation point of 404° F., and a 90% point of 569° F.

Tests in Diesel fuel

| Compound | Percent used | Cetene No. increase |
|---|---|---|
| Ethyl-triazo formate | 1 | 2 |
| 1:2 diazido ethane | 1 | 4 |

These tests indicate results of commercial significance, since an increase of 5 points in cetene number is commercially well worth while.

These compounds and others have likewise been tested in admixture with gasolines and evaluated by noting the decrease in octane number. The following tabulation, similar in set-up to that above, shows results obtained from mixtures of one percent of the indicated azides with a standard reference fuel gasoline of 75 octane number:

Tests in gasoline

| Compound | Percent used | Octane No. decrease |
|---|---|---|
| Triazo-acetone | 1 | 3.0 |
| Ethyl-triazo acetate | 1 | 0.6 |
| Beta-triazo ethanol | 1 | 1.5 |
| Ethyl-triazo formate | 1 | 4.5 |
| Beta-triazo-ethyl triazo acetate | 1 | 3.0 |
| 1:2 diazido ethane | 1 | 9.8 |

From the above data it may be seen that novel ingredients herein proposed are effective for the purpose intended, namely that of promoting the combustion of mineral hydrocarbons in a manner capable of increasing their suitability for use in internal combustion engines of the Diesel type.

The above compounds are identified by the presence of the monovalent —N₃ radical and are spoken of as azido or triazo compounds. Other members of the group which are useful for the purposes of this invention are triazoacetic acid, triazoacetamide, triazoformic acid, triazopropionic acid, allyl azoimide, ethyl esters of the several triazo acids, esters of the several triazo acids and triazoethanol, and other azido derivatives of the aliphatic hydrocarbons, as triazoethylene. In general, only those azido or triazo derivatives of compounds of relatively low molecular weight are preferred, the influence of the —N₃ radical disappearing rapidly with increases in the molecular weight of the compounds into which it is substituted, certain triazoethanol esters of aromatic acids being entirely without effect. Among the group of compounds generally found useful, preference is had for those containing relatively great amounts of the —N₃ radical, as, for example the esters of triazo ethanol and triazo acids, low molecular weight triazo ketones and triazo acids, and more particularly the triazo derivatives of lower aliphatic hydrocarbons, as diazido ethane and triazo ethylene. In general terms, sufficiently great proportion of the —N₃ radical is present for the purposes of this invention in those azido substituted aliphatic compounds of the various classes having from two to five carbon atoms, inclusive.

These compounds may be used in percentages up to about ten per cent of the fuel, but in general, lower concentrations are sufficiently effective, and under normal conditions, not more than five per cent of the preferred members will be necessary to bring about substantial improvement in the fuel as expressed by decrease in ignition delay period.

In the following claims, the term "Diesel fuel" means any, and includes all types of hydrocarbon products intended for use in any engine operating according to the Diesel cycle.

We claim:

1. An improved Diesel fuel, comprising a liquid hydrocarbon fuel and in admixture therewith a minor proportion, sufficient to decrease the ignition delay period of the fuel, of one or more compounds selected from the group consisting of triazo-acetone, triazo-ethanol, ethyl-triazo formate, triazo-ethyl-triazo acetate, and 1:2 diazido ethane.

2. An improved Diesel fuel, comprising a liquid hydrocarbon fuel and in admixture therewith a minor proportion, sufficient to decrease the ignition delay period of the fuel, of 1:2 diazido ethane.

3. An improved Diesel fuel, comprising a liquid hydrocarbon fuel and in admixture therewith a minor proportion, sufficient to decrease the ignition delay period of the fuel, of ethyl triazo formate.

4. An improved Diesel fuel, comprising a liquid hydrocarbon fuel and in admixture therewith a minor proportion, sufficient to decrease the ignition delay period of the fuel, of triazo acetone.

ROBERT C. MORAN.
DARWIN E. BADERTSCHER.